(12) United States Patent
Russell

(10) Patent No.: US 6,510,704 B1
(45) Date of Patent: Jan. 28, 2003

(54) SINGLE AND DUAL TRANSFERABLE BATTERY-OPERATED ICE CREAM MAKER

(76) Inventor: Floyd Edward Russell, 2171 Shannon Ave., Memphis, TN (US) 38108

(*) Notice: Subject to any disclaimer, the term of this patent is extended or adjusted under 35 U.S.C. 154(b) by 0 days.

(21) Appl. No.: 09/966,894

(22) Filed: Sep. 28, 2001

(51) Int. Cl.$^7$ ................................................ A23G 9/00
(52) U.S. Cl. ........................................ 62/342; 366/251
(58) Field of Search .................... 62/342, 343; 366/249, 366/251

(56) References Cited

U.S. PATENT DOCUMENTS

| | | | | |
|---|---|---|---|---|
| 4,070,957 A | * | 1/1978 | Korekawa et al. | 62/342 |
| 4,450,692 A | * | 5/1984 | Sharpe et al. | 62/342 |
| 4,664,529 A | * | 5/1987 | Cavalli | 366/149 |
| 4,716,822 A | * | 1/1988 | O'Brien | 62/342 |
| 4,773,233 A | * | 9/1988 | Kawasumi et al. | 62/342 |
| 5,022,315 A | * | 6/1991 | Bertram et al. | 62/437 |
| 6,041,614 A | * | 3/2000 | Yamaya et al. | 62/340 |
| 6,308,522 B1 | * | 10/2001 | Jones et al. | 62/114 |

\* cited by examiner

Primary Examiner—William E. Tapolcai
Assistant Examiner—Mohammad M. Ali
(74) Attorney, Agent, or Firm—Walker, McKenzie & Walker PC

(57) ABSTRACT

A single and dual transferable battery-operated ice cream maker to be used in the freezer compartment of any domestic or commercial refrigerator and/or ice chest comprising: product containers into which the ice cream ingredients are placed; a timer-controlled creamer for stirring the ingredients; a motorized lid connected to said creamer; a temperature sensor making contact with said product container; a container housing where said product containers and cooling mechanisms are located; an audible means to indicate completion of process; and a storage lid to cover the product container.

8 Claims, 18 Drawing Sheets

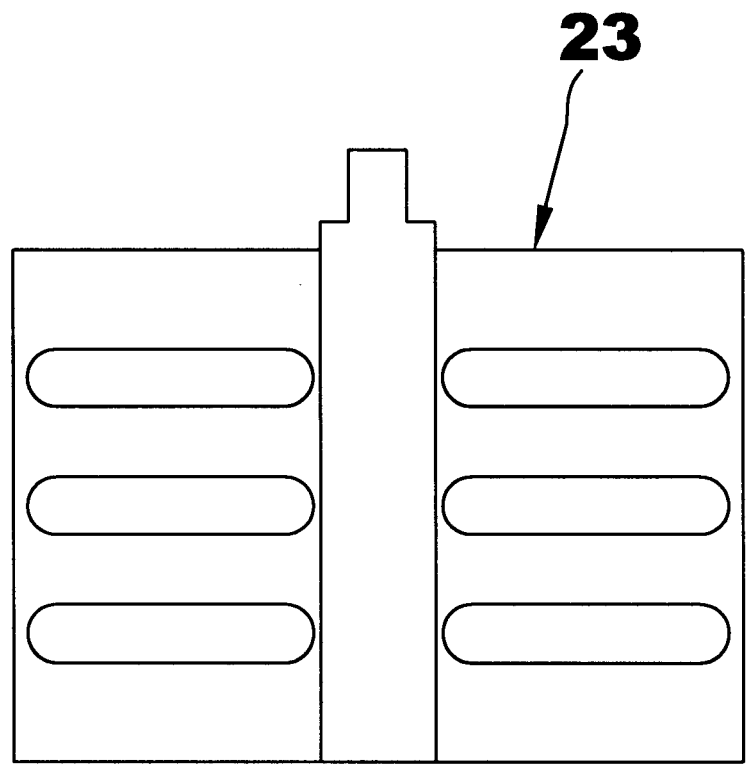
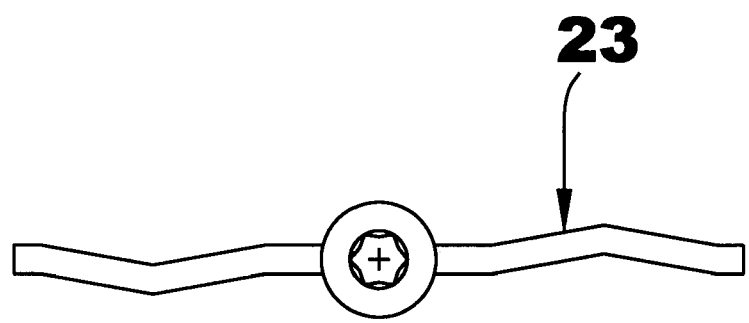
FIGURE 8

FIGURE II

SINGLE AND DUAL TRANSFERABLE BATTERY-OPERATED ICE CREAM MAKER

BACKGROUND OF THE INVENTION

This invention relates to an automatic ice cream maker and more particularly to a portable transferable automatic ice cream maker to be operated in the freezer compartment of any domestic or commercial refrigerator and/or ice chest. A domestic ice-cream maker is comprised of an ingredients container into which ice cream ingredients are placed, a stirring device, and at one time a hand crank but now a motorized stirrer. The ingredients' container is housed within another chamber where ice and salt are placed or the chamber contains a coolant system. Whether by motor or by hand cranking, the ingredients are subjected to a cold temperature, thereby freezing them. After the ingredients' temperature reaches a desired thickness, they are tested based on taste and touch to verify if additional freezing is required; thus requires constant monitoring. After the desired thickness is reached, the ingredients are removed and placed in a separate container for storage.

Domestic ice-cream maker inventions during the seventies utilize the freezer. Where as, some are a permanent fixture of the refrigerator and use a hand crank located outside of the refrigerator, others uses a motor which saves time and human energy, however, both types are heavy and their size makes them non-transferable. During the eighties, and ice-cream maker was patented to be used in a freezer; however the invention "blew cold air from the freezer compartment directly into the ice-cream mix while being stirred" which allows outside odors to penetrate and contaminates the ice-cream mixture. Refrigerated air is encapsulated and recycled within the freezer, thereby allowing spoiled or pungent food odors to enter the freezer. This particular cream maker uses eight batteries, "four of the cells 18 are use to drive the motors of two fans 23 and 24 and four to drive the motor 22", and uses a clutch as a warning device.

There is yet another type of portable ice-cream maker that uses normal electrical current. It contains a double insulated bowl that must be frozen prior to use anywhere from eight to twenty-four hours. Therefore, it is the objective of this invention to provide an ice cream maker that is light-weight and transferable; can be utilized in the freezer of any normal domestic or commercial refrigerator and/or normal-sized ice chest; seals in the ice-cream mixture from odors and contaminants; has an audible timer and warning system; offers state of the art circuitry to charge a 18 or 24 volt battery in less than one hour, is easy to remove and store ice cream; can produce two different flavors simultaneously, and can it comes produce two flavors of ice cream at one time.

BRIEF SUMMARY OF THE INVENTION

Knowingly, the objective of any invention is to make life less cumbersome and uncomplicated. In the Digital Age, society has grown accustomed to having certain tasks done in nanoseconds without compromising the quality of the product. These ice cream makers will satisfy today's appetite by providing faster and efficient methods through saving time, being just the right size, easy storage, and variety.

The main advantage these invention is to eliminate constant monitoring by providing a timing system that can be preset to complete the process in under thirty (30) minutes. It also provides a safety measure of stopping the process in the event the timing process does not. Ice cream makers of the last millennium used physical assertion, both through mixing and testing to see if it was ready. Granted some ice cream makers are motorized but the preparation time prior to actually processing the cream is too time-consuming. These inventions bestow the owners a forget-it-and-leave-it frame of mind so many of the Digital Generation possess, thus saving time.

Secondly, the dimensions of the ice cream makers are designed to be placed in the freezer compartment of any domestic or commercial refrigerator. One type can be operated within any average sized ice chest and the others can be adapted as well for outdoor activity. Whether in-house or outside these ice cream makers are portable and transferable. Traditionally, ice cream makers are to placed and operated outside of a freezer and never inside of an ice chest. After the ice cream is ready for consumption, it is then placed in some type of container into the freezer to retain its solidity.

Thirdly, these inventions factor in the convenience our fast paced society demands with an easier method of removal and storage. This is accomplished by removing the following: the ice cream maker from the freezer after a device emits a sound, the motorized lid; and the product container. Then place the provided container lid on the product container and place it back into the freezer or ice chest. Simply clean the creamer that is attached to the motorized lid. The container housing is never exposed to any ice cream making product. In years past, cleaning an ice cream maker meant scraping the blades, and washing each component, with the exception of anything housing electrical components, in order to make a different flavor.

Making two different flavors of ice cream are accomplished with the dual ice cream maker. It does what no other domestic ice cream maker can, by satisfying the palate of a consumer who likes vanilla ice cream versus another who likes buttered pecan, and/or another who prefers raspberry sorbet over strawberry yogurt. Currently the only way to have a choice of two different types of ice cream or yogurt is to patronize a commercial establishment. This ice cream maker has virtually two of all the significant components. The advantage over traditional ice cream makers is you will never have to wait during the clean-up time for a second treat. Moreover, ice cream lovers can satisfy their different tastes whether at home or at a picnic.

BRIEF DESCRIPTION OF DRAWINGS

FIG. 8 is a frontal and top view of the creamer for an ice cream maker describe in FIG. 1 and in FIG. 9;

DETAILED DESCRIPTION OF THE INVENTION

With the exception of the motorized lid, container housing, product container, component cover, and lids, which will need to be manufactured through molding or casting, the other components can be purchased anywhere throughout industry. The distinguishing factors these inventions have over pre-existing domestic ice cream makers are size, portability, convenience and duality. A detailed account of these inventions will be described below with reference to the drawings.

Figure 1:
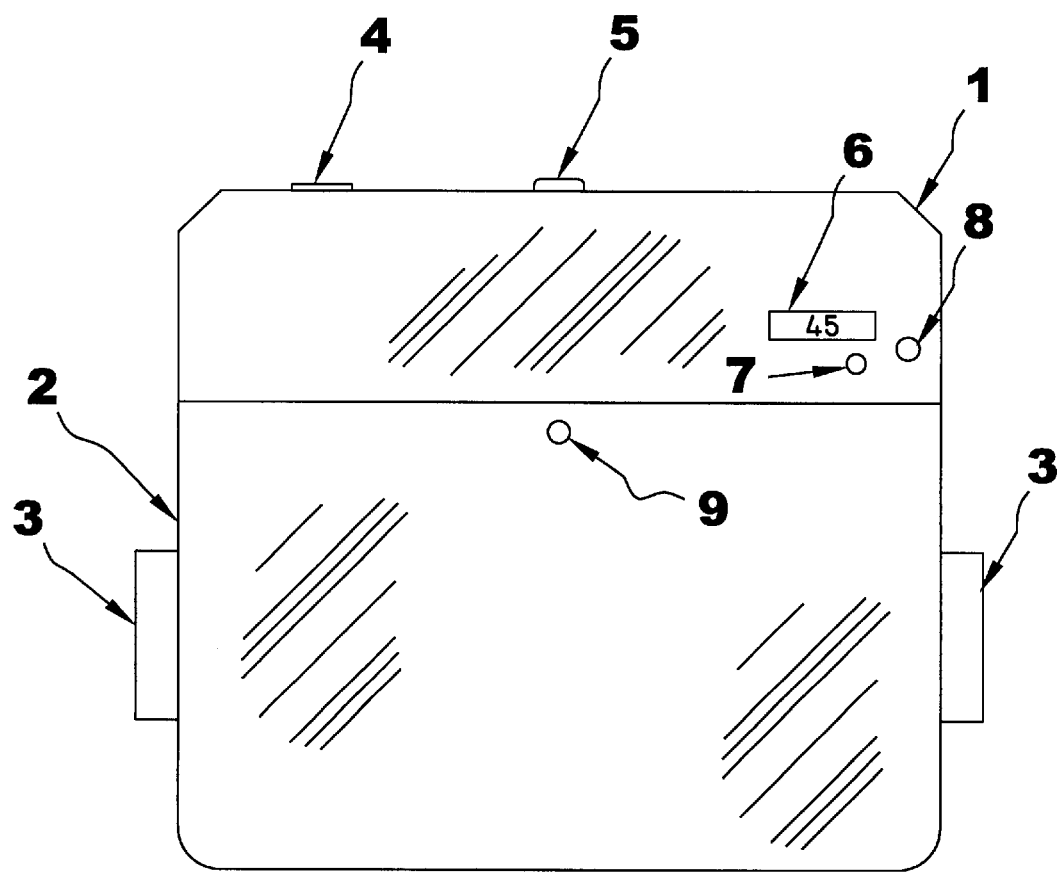
FIG. 1 is a frontal view frontal view of an ice cream maker that has a fan motor assembly.

FIG. 1 is a frontal view of an ice cream maker that has a fan motor assembly. It comprises a Motorized Lid 1 to house the gear motor, gear box assembly and a circuit board; a Container Housing 2 where a container that holds the ice ingredients is placed; a Fan Housing 3 to shelter and protect the cooling fans; an Additive Plug 4 to prevents freezer odors from entering into the product container; a Push Button Latch Assembly 5 to secure the component cover to the motorized lid; an LED Readout Annunciation Panel 6 to display the time remaining in a cycle; a Push Button Reset 7 to restart the ice cream maker should it stop; an On/Off Push Button 8 to start the ice cream maker; and a Push Button Latch Assembly 9 to secure the motorized lid to the container housing. Suggested dimensions are 9 ½ "height X 9" width, with a total weight of 32 ounces.

Figure 2:
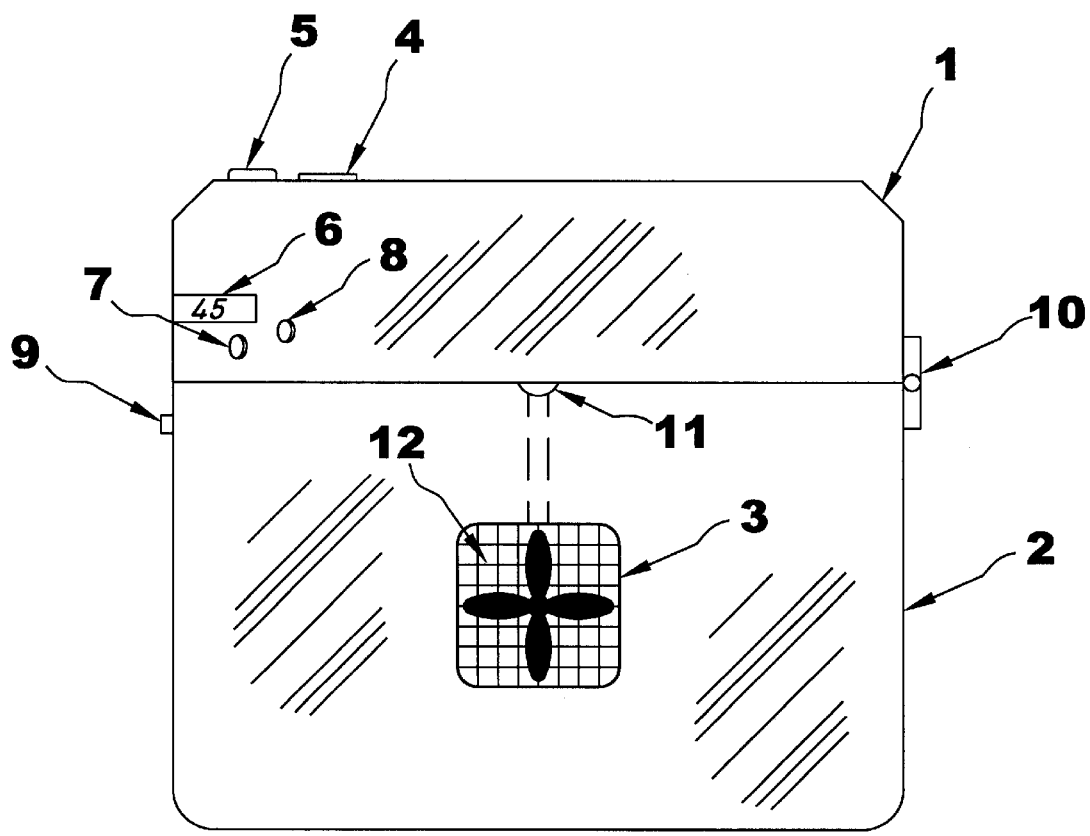
FIG. 2 is a side view of an ice cream maker describe in FIG. 1.

FIG. 2 is a side view of the ice cream maker in FIG. 1 depicting all the aforementioned components except a Spring Loaded Hinge Assembly 10 connecting the motorized lid and container housing together; a Power Strip 11 to supply power to fan motor; a Fan Grill 12 to protect the fan blades; and a Fan Motor Assembly 13 which supplies cold air to the product container.

Figure 3:
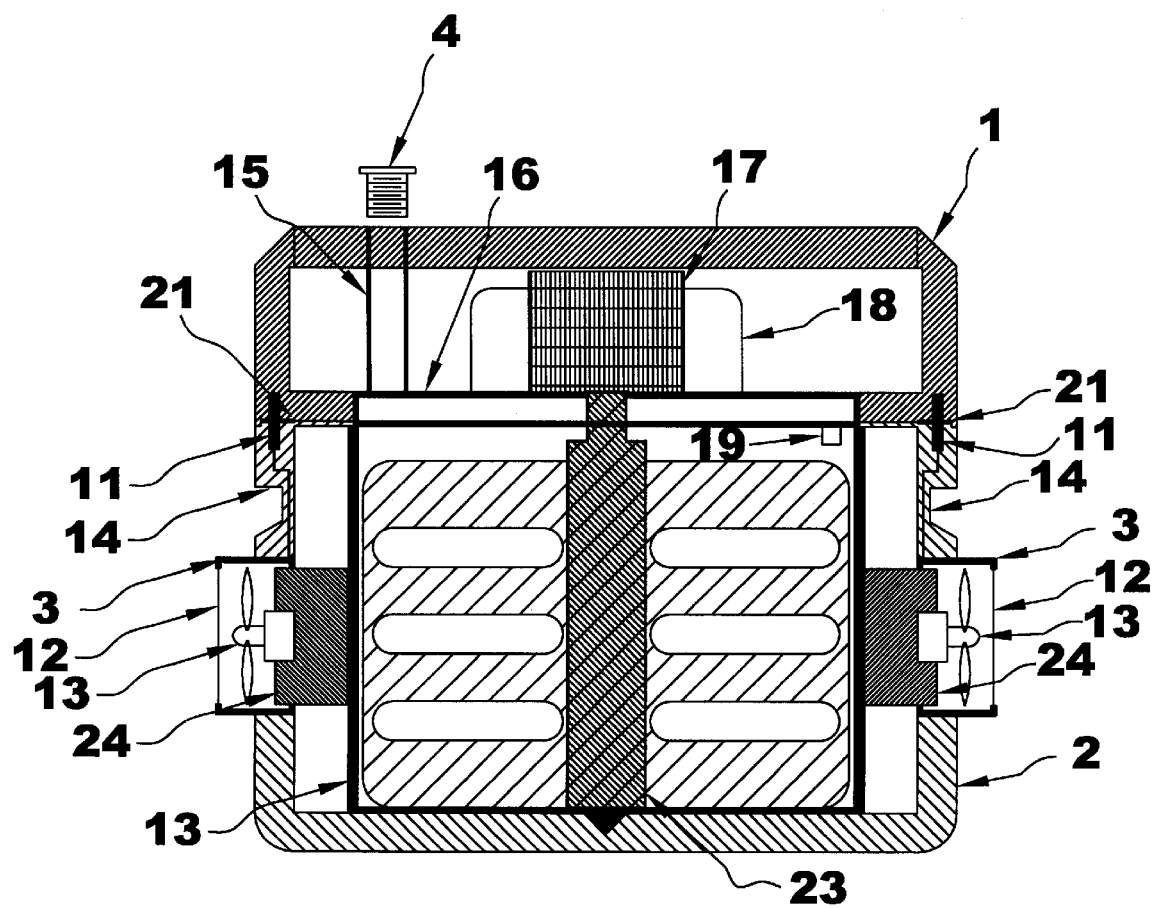
FIG. 3 is an exposed front view of an ice cream maker describe in FIG. 1.

FIG. 3 is an exposed front view of the ice cream maker in FIG. 1 depicting a Motorized Lid 1, a Container Housing 2, Fan Housing 3, an Additive Plug 4, a Power Strip 11, two Fan Grills 12, two Fan Motor Assemblies 13; two Container Housing Handles 14; an Additive Tube 15 where ingredients pass from the additive hole into the product container; a Container Lid 16 which is part of the motorized lid that covers the product container; Gear Box and Gear Motor Assembly 17 to spin the creamer that whips and combines the ingredients; an 18 or 24 Volt Battery Power Source 18 to supply voltage; a Temperature Sensor 19 to detect the drop in temperature of the product container; a Component Cover 20 enclose and protect the components of the motorized lid; a Seal 21 to prevent outside odors from penetrating the ingredient inside the product container; a Product Container 22, the vessel into which ingredients are poured, stirred, and frozen; a Creamer 23 to stir the ingredients inside of the product container; and an Air Diverter 24 to divide the air flow evenly across the product container.

Figure 4:
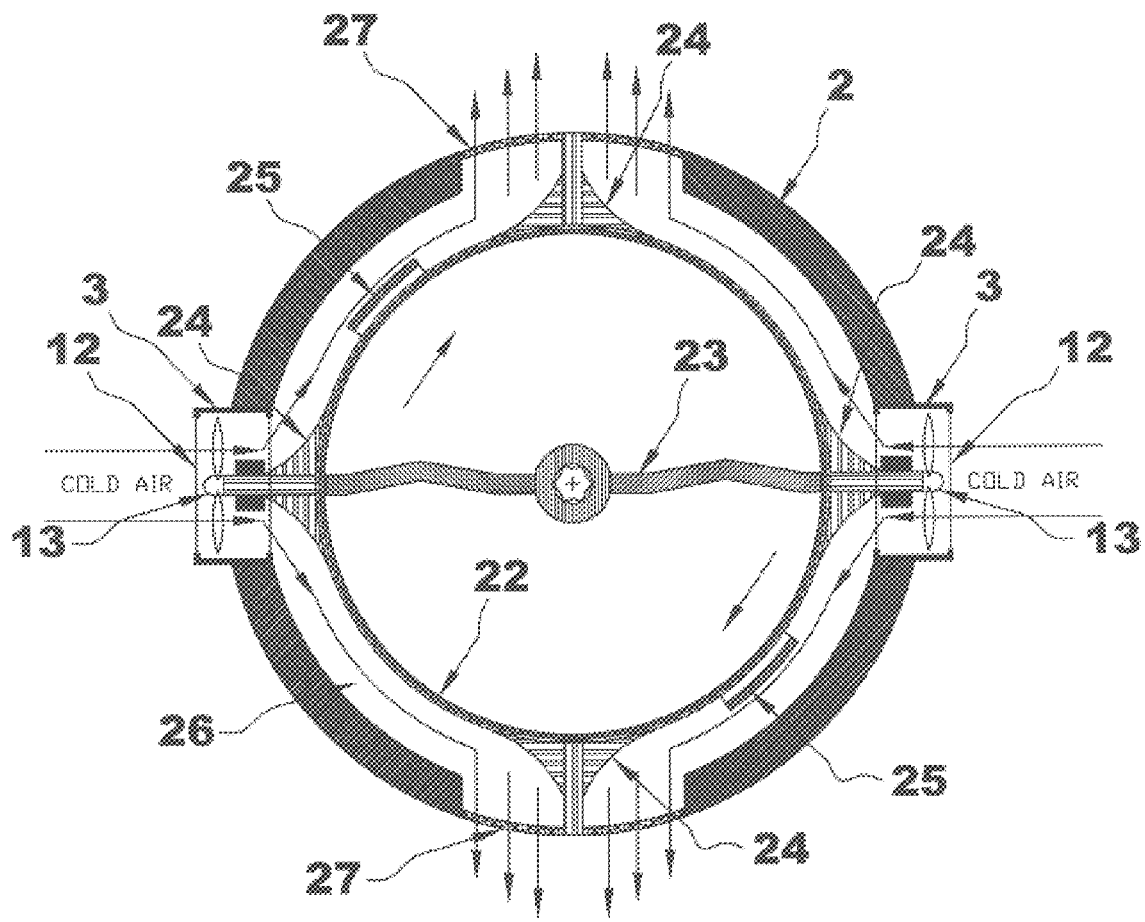
FIG. 4 is a top exposed view of an ice cream maker describe in FIG. 1.

FIG. 4 is a top exposed view of the ice cream maker in FIG. 1. It comprises a Container Housing 2, Fan Housing 3, two Fan Grills 12, two Fan Motor Assemblies 13, a Product Container 22, a Creamer 23, two Air Diverters 24, Two Product Container Handles 25, with springs, allowing an easier removal of the product container, a Vortex Air Channel 26 as a passageway for freezer air to pass across the product container, and two Exhaust Ports 27 to siphon the warm air discharged by passing over the product container.

Figure 5:
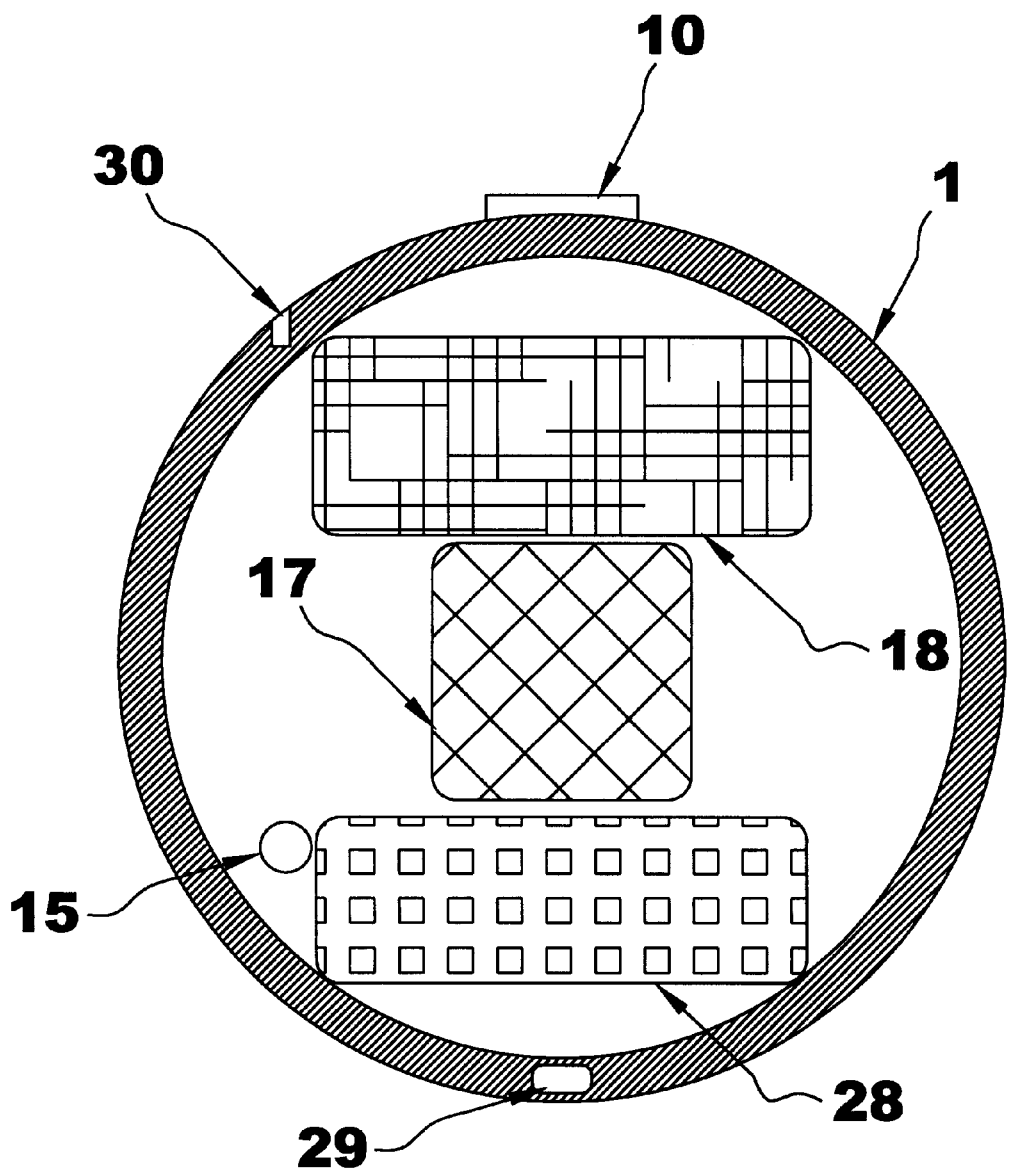
FIG. 5 is a top exposed view of the motorized lid for an ice cream maker describe in FIG. 1 and in FIG. 9.

FIG. 5 is a top exposed view of the motorized lid for the ice cream makers in FIGS. 1 and 9 (see FIG. 9 below). It comprises a Spring Loaded Hinge Assembly 10, an Additive Tube 15, a Gear Box and Gear Motor Assembly 17, an 18 or 24 Volt Battery Power Source 18, a Circuit Board 28 that houses the electronic components (see FIG. 18 below), a Latch Slot 2 that secures the component lid to the motorized lid, and a Charging Connection 30 for recharging the battery.

Figure 6:
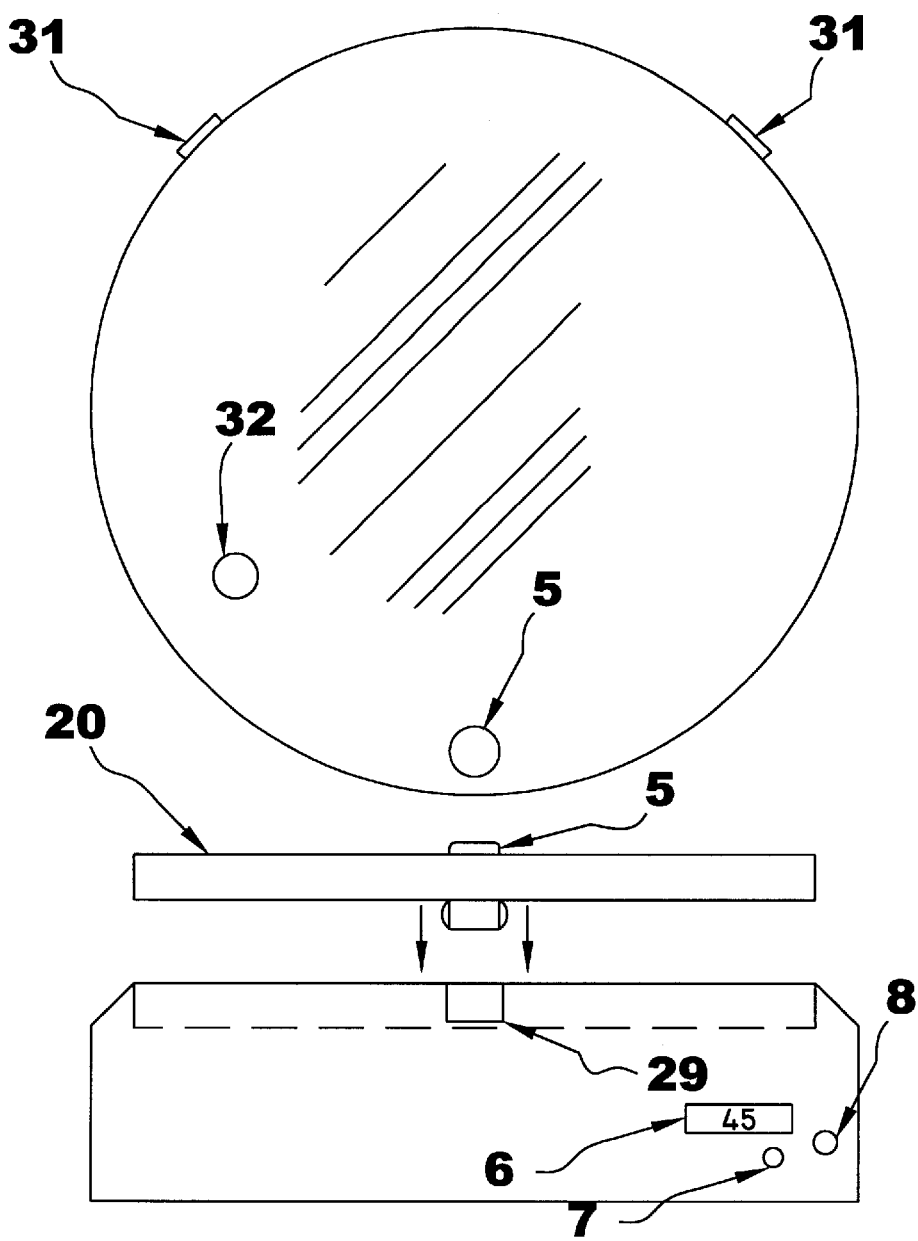
FIG. 6 is a sectional view of the motorized lid for an ice cream maker describe in FIG. 1 and in FIG. 9.
Figure 9:
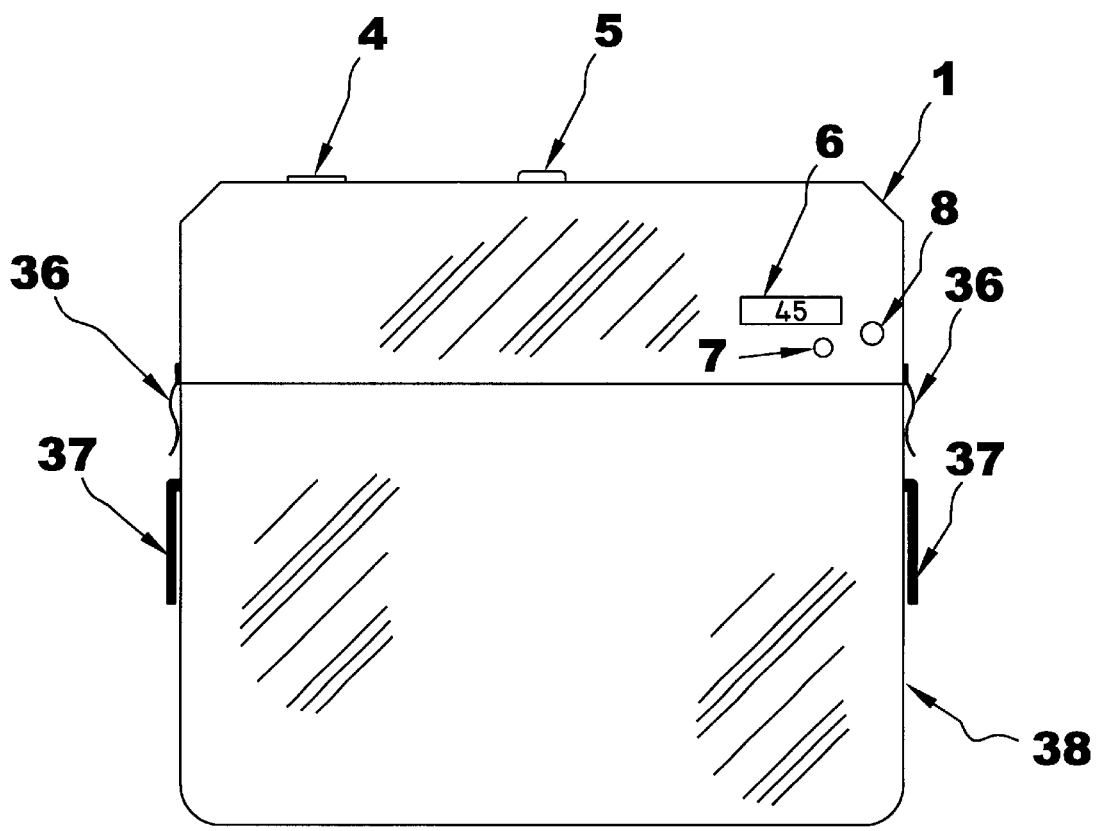
FIG. 9 is a frontal view of an ice cream maker that has no fan motor assembly.

FIG. 6 is a sectional view of the motorized lid for the ice cream makers in FIGS. 1 and 9. It comprises a Push Button Latch Assembly 5, an LED Readout 6, a Push Button Reset 7, an On/Off Push Button 8; a Component Cover 20 to enclose and protect the components of the motorized lid; a Latch Slot 29 to secure the component lid to the motorized lid; a Component Lid Tab 31 to tightly seal the component cover; an Additive Hole 32 into which additional ingredients, i.e., berries, nuts, etc., can be added during the stirring process; and a Seal 33 to prevent moisture from entering the motorized lid.

Figure 7:
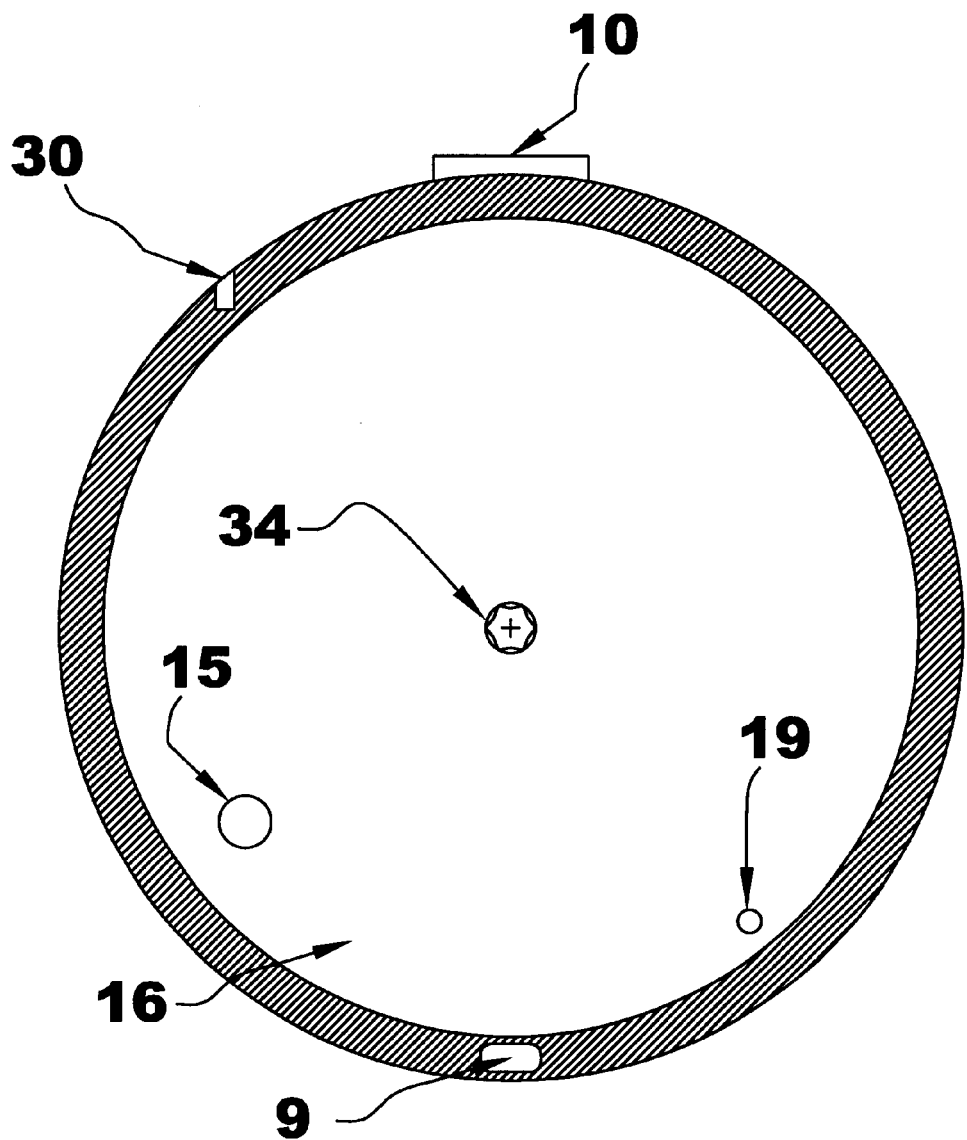
FIG. 7 is a bottom view of the motorized lid for an ice cream maker describe in FIG. 1 and in FIG. 9.

FIG. 7 is a bottom view of the motorized lid for the ice cream makers in FIGS. 1 and 9. It comprises a Push Button Latch Assembly 9, a Spring Loaded Hinge Assembly 10, an Additive Tube 15, a Container Lid 16, a Temperature Sensor 19, a Charging Connection 30, and a Creamer Connection 34 that attaches to the creamer apparatus and the bottom edge 35 of the motorized lid.

FIG. 8 is a frontal and top view of the Creamer 28 for the ice cream makers in FIGS. 1 and 9, which stirs the ingredients inside of the product container.

FIG. 9 is a frontal view of an ice cream maker that does not have a fan motor assembly. It comprises a Motorized Lid 1, an Additive Plug 4, a Push Button Latch Assembly 5, an LED Readout 6, a Push Button Reset 7, an On/Off Push Button 8, a Container Latch Assembly 36, a Container Handle 37, and a Product Container 38. Suggested dimensions are 9" in height by 8' in length with a total weight of 20 ounces.

Figure 10:
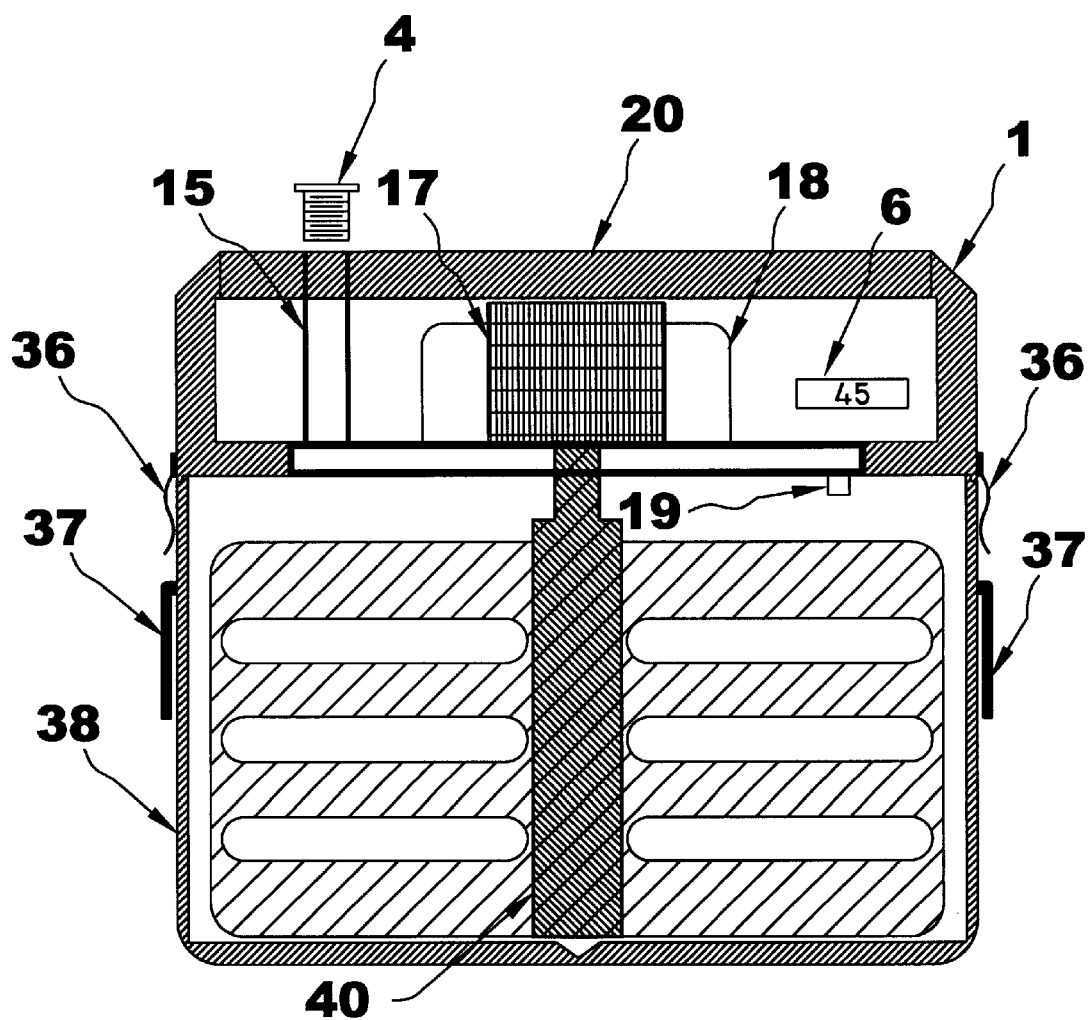
FIG. 10 is an exposed frontal view of an ice cream maker that is described in FIG. 9.

FIG. 10 is an exposed frontal view of the ice cream maker describe in FIG. 9 and comprises a Motorized Lid 1, an Additive Plug 4, an LED Read Out 6, an Additive Tube 15, a Container Lid 16, a Gear Box and Gear Motor Assembly 17, and 18 or 24 Volt Battery Power Source 18, a Temperature Sensor 19, a Component Cover 20, two Container Latch Assemblies 36, two Container Handles 37, a Product Container 38, and a Creamer.

Figure 11:
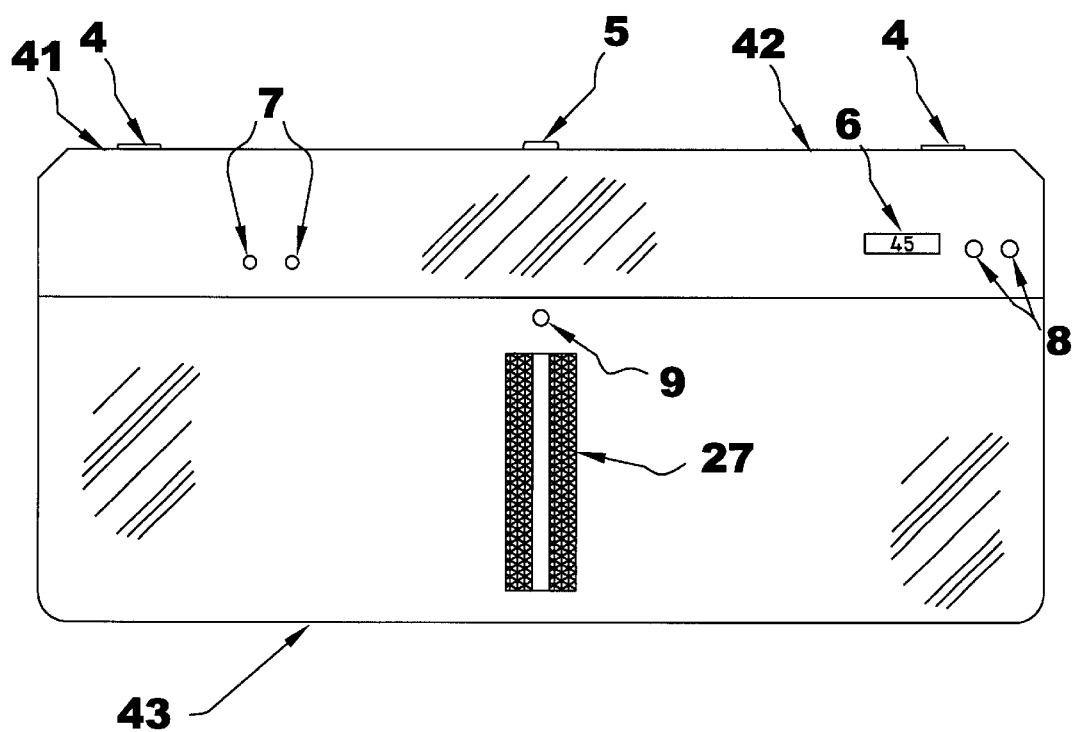
FIG. 11 is a frontal view of an ice cream maker with dual product containers.

FIG. 11 is a frontal view of an ice cream maker with dual product containers with two Additive Plugs 4, a Push Button Latch Assembly 5, an LED Readout 6, two Push Reset Buttons, 7, two On/Off Push Buttons 8, a Push Button Latch Assembly 9; a Fan Grill 12, an Exhaust Port 27, a Motorized Lid 41, a Component Cover 42, and a Container Housing 43. Suggested dimensions are 9 ½" in height, 9" in width, 14" in length with a total weight of 48 ounces.

Figure 12:
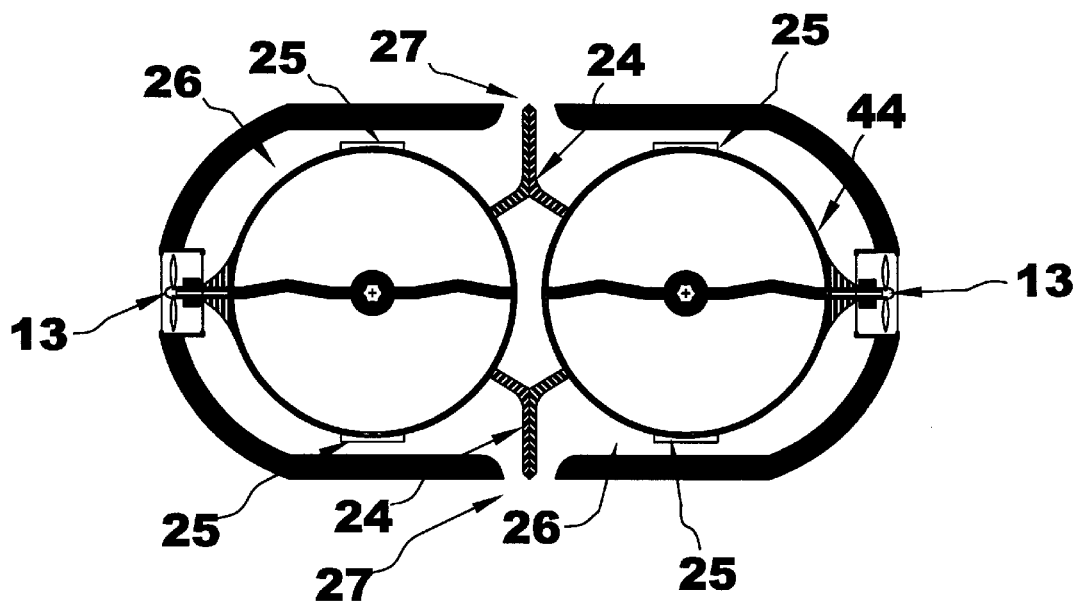
FIG. 12 is top view of an ice cream maker describe in FIG. 11.

FIG. 12 is top view of the ice cream maker described in FIG. 11. It comprises two Fan Motor Assemblies 13, two Air Diverters 24, two Product Container Handles 25, two Vortex Air Channels 26, two Exhaust Ports 27, a Container Housing 43, and two Product Containers 44.

Figure 13:
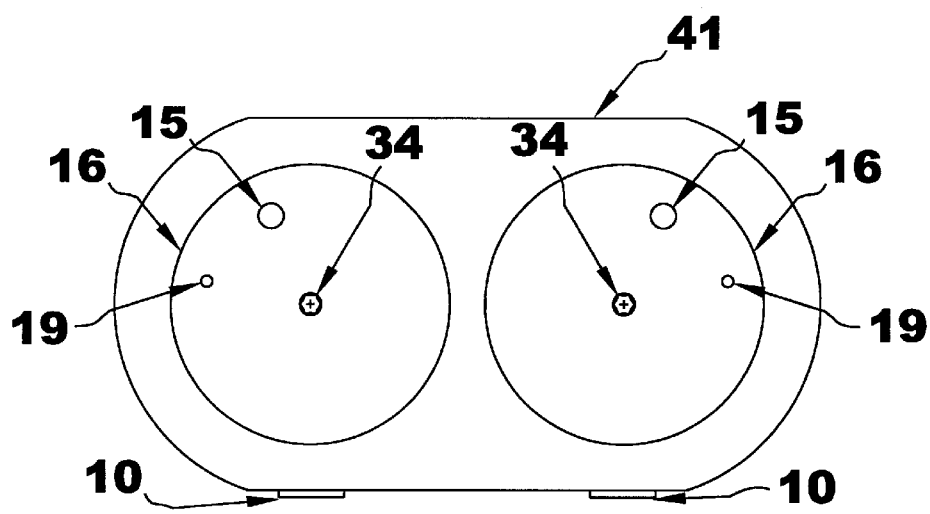
FIG. 13 is a bottom view of the motorized lid of an ice cream maker described in FIG. 11.

FIG. 13 is a bottom view of the motorized lid 41 of the ice cream maker described in FIG. 11 and comprises: two Spring Loaded Hinge Assemblies 10, two 2 Additive Holes 15, two Container Lids, two Temperature Sensors 19, and two Creamer Connections 34.

Figure 14:
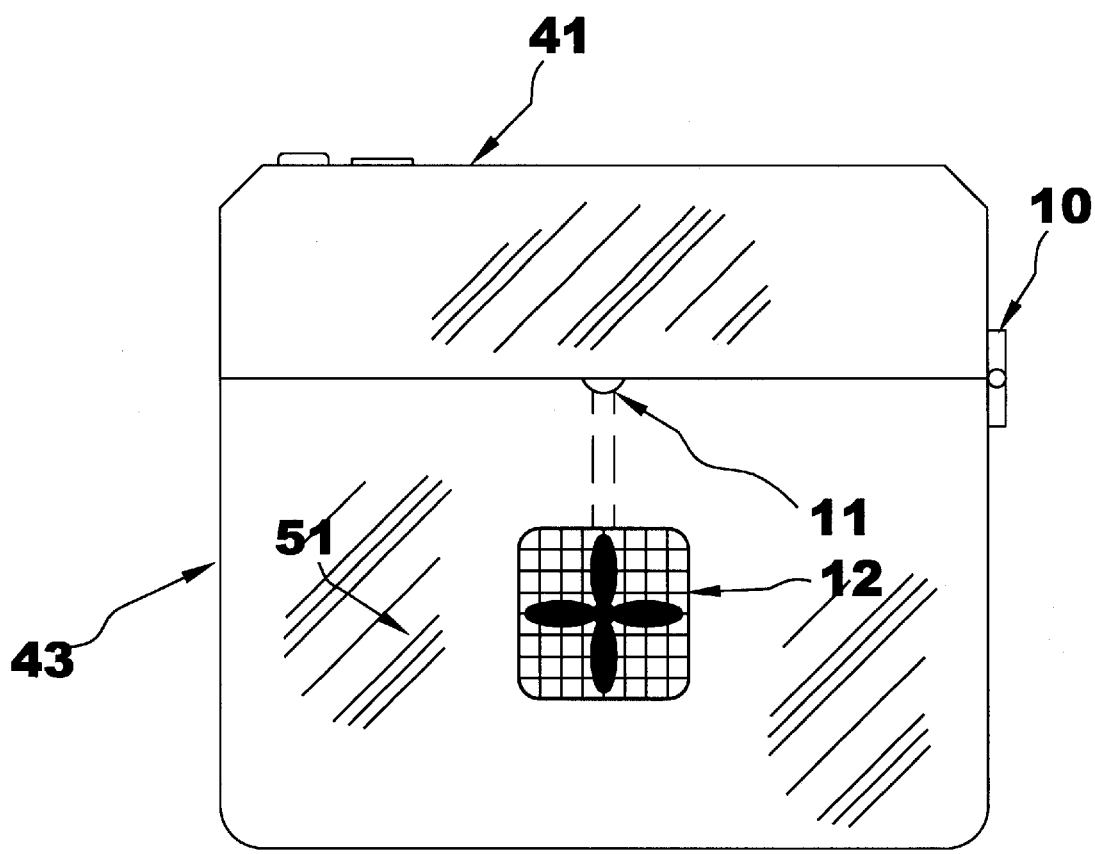
FIG. 14 is a side view of the container housing of an ice cream maker described in FIG. 11.

FIG. 14 is a side view of the container housing 43 of the ice cream maker described in FIG. 11 and comprises a Spring Loaded Hinge Assembly 10, a Power Strip 11, a Fran Grill 12, a Fan Motor Assembly 13, and a Motorized Lid 41

Figure 15:
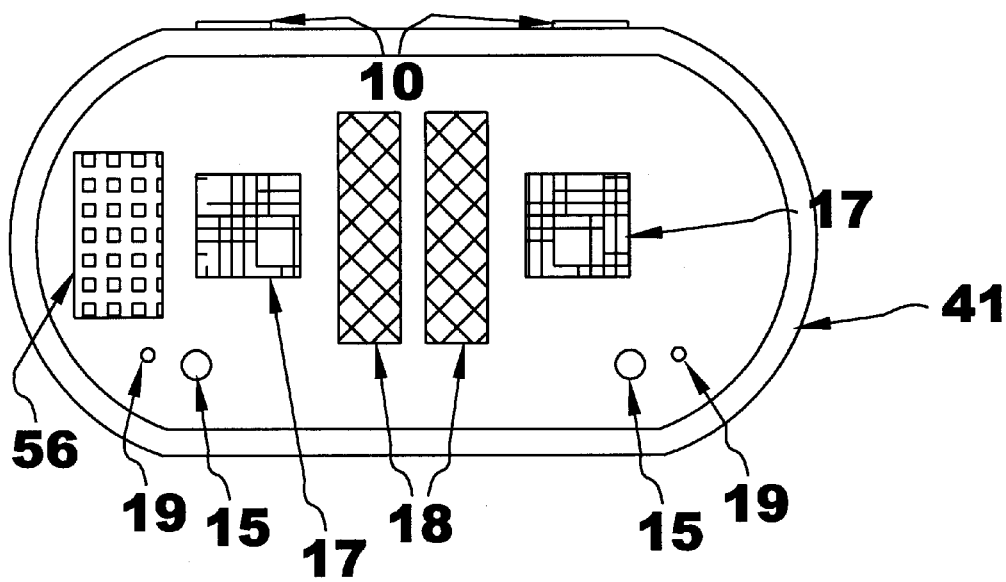
FIG. 15 is a exposed top view of the motorized lid of an ice cream maker described in FIG. 11.

FIG. 15 is a exposed bottom view of the motorized lid 41 of the ice cream maker described in FIG. 11 and comprises two Spring Loaded Hinge Assemblies 10, two Additive Tubes 15, two Gear Box and Gear Motor Assemblies 17, two Temperature Sensors 19, a Motorized Lid 41, and a Product Container 44.

Figure 16:
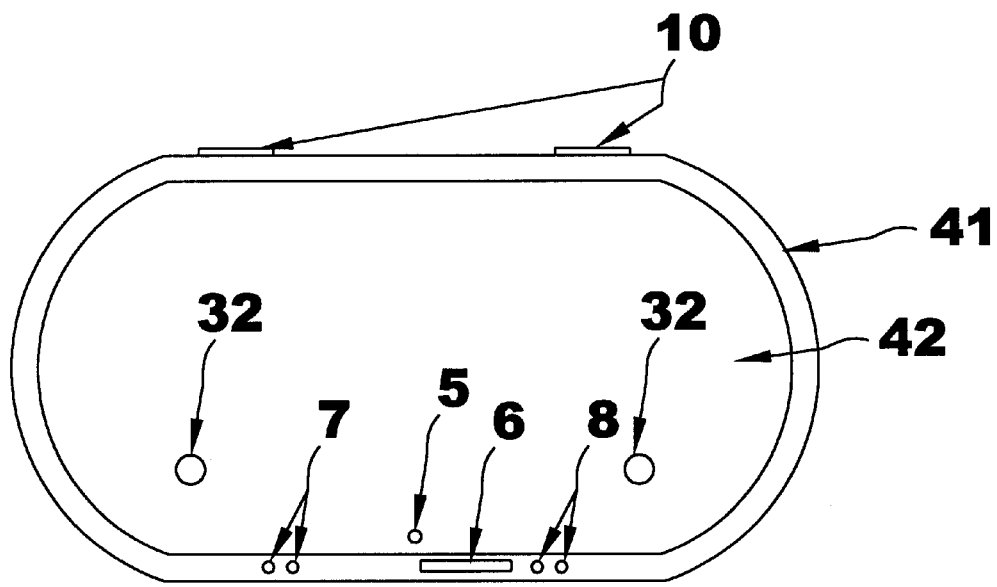
FIG. 16 is a top view of the motorized lid of an ice cream maker described in FIG. 11.

FIG. 16 is a top view of the motorized lid 41 of the ice cream maker described in FIG. 11 which comprises: a Push Button Latch 5, an LED Readout 6, two Reset Push Buttons 7, two On/Off Push Buttons 8, two Spring Loaded Hinge Assemblies 10, two Additive Holes 32, and a Component Cover 42.

Figure 17:
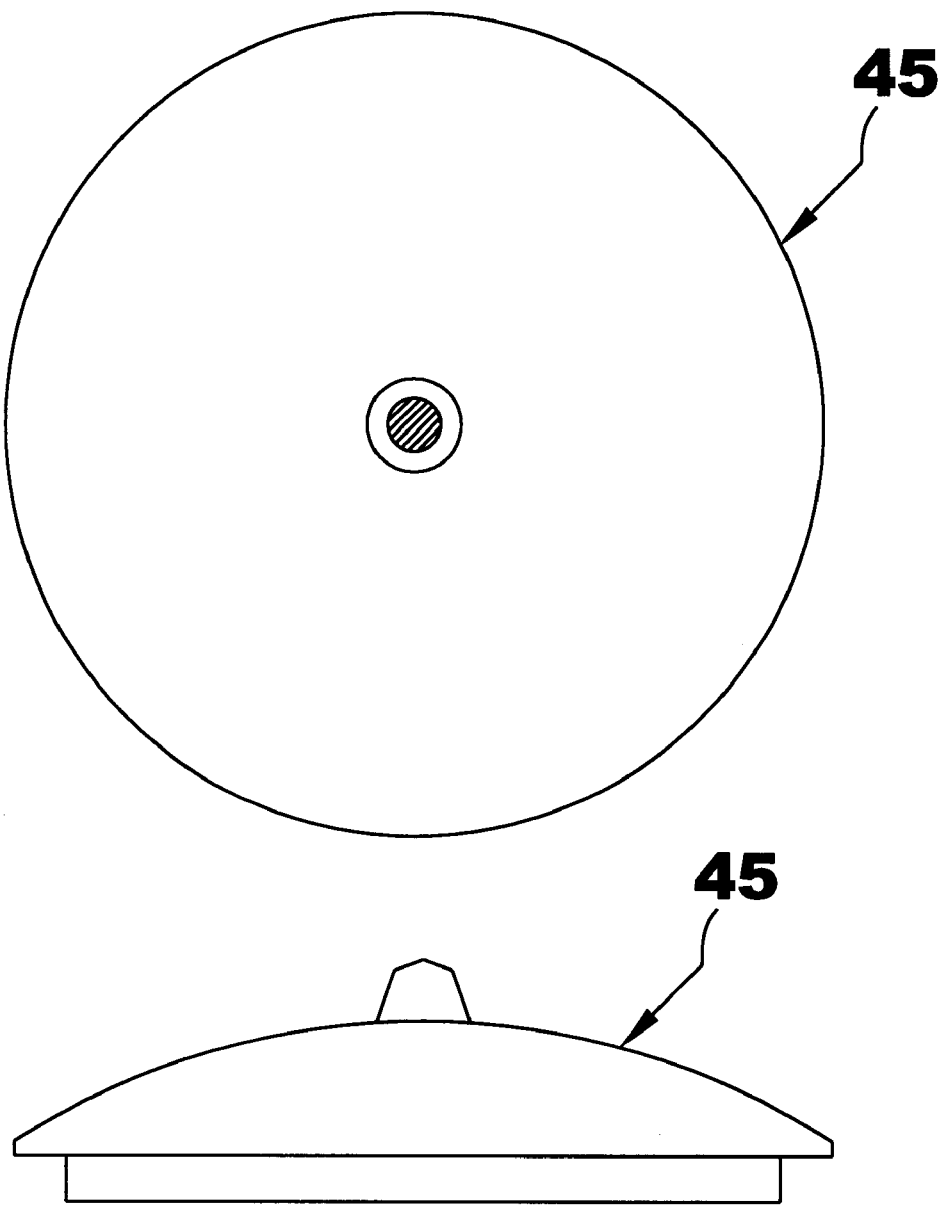
FIG. 17 is side and top view of the storage lids of an ice cream maker described in FIG. 11.

FIG. 17 is side and top view of the storage lid 45 of the ice cream maker described in FIG. 11.

Figure 18:
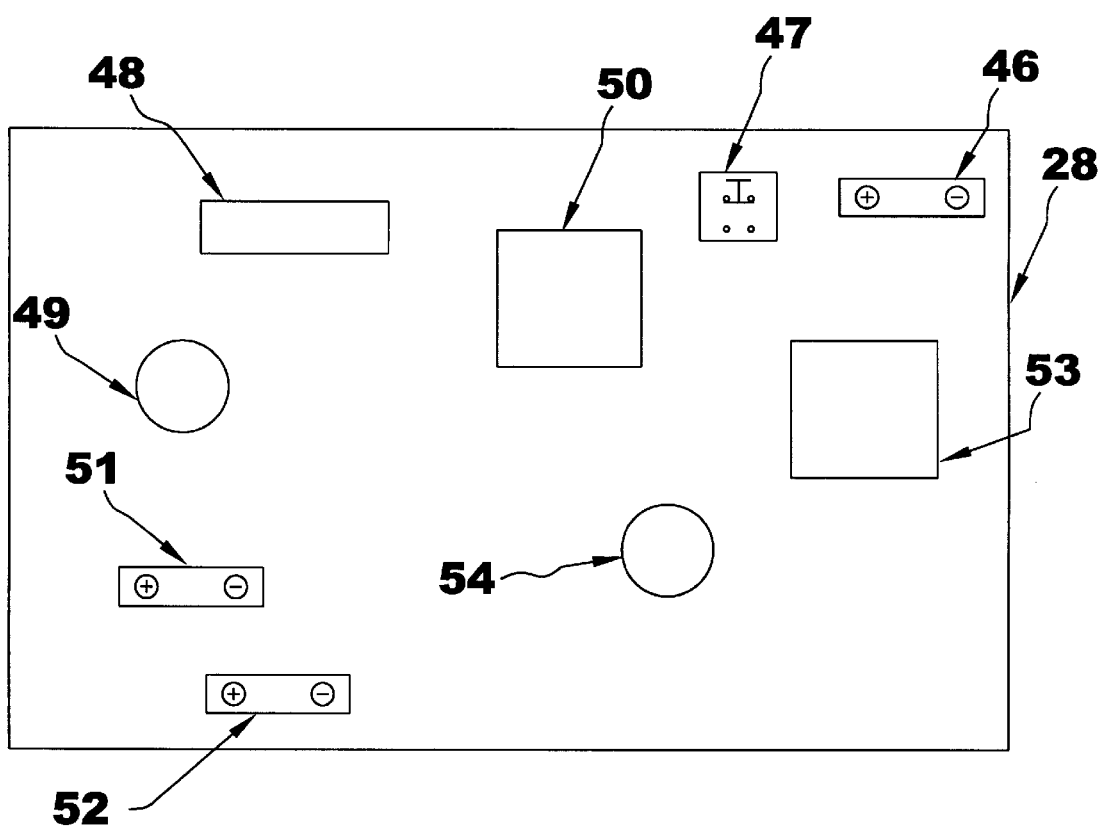
FIG. 18 is the circuit board for an ice cream maker that has a fan motor assembly described in FIG. 1.

FIG. 18 is the Circuit Board 28 that houses the electronic components for of the ice cream maker that has a fan motor assembly describe in FIG. 1, which comprises an Electrical Jack 46 to plug in the battery, an On/Off Switch 47 to allow an 18 or 24 volt DC to circuit board, a Circuit Breaker 48 to stop the freezing cycle, a Temperature Switch 49 when closed, starts the freezing process, a Timer 50 to start and stop the ice cream making cycle, a Fan Motor Assembly Contact 51 to supply an 18 or 24 volt DC power to the fan motors, a Gear Motor 52 to supply an 18 or 24 volt DC power to the gear motors, a Pulsating 15 second Timer 53 that sounds a warning if there is a problem, and a Pezo Buzzer 54 that emits the sound if there is a problem during the freezing cycle.

Figure 19:
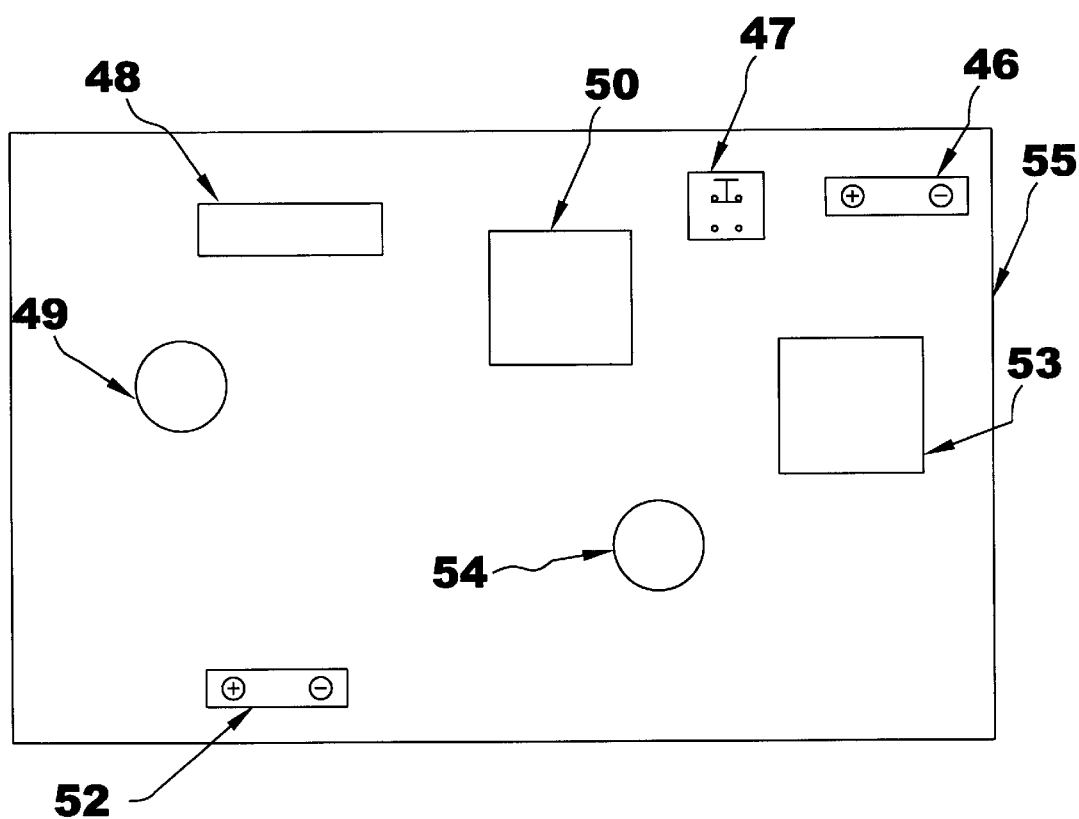
FIG. 19 is the circuit board for an ice cream maker that has no fan motor assembly described in FIG. 9.

FIG. 19 is the circuit board 55 an ice cream maker that does not have a fan motor assembly described in FIG. 9, which comprises an Electrical Jack 46, an On/Off Switch 47, a Circuit Breaker 48, a Temperature Switch 49, a Timer 50, a Gear Motor Contact 52, a Pulsating 15 second Timer 53, and a Pezo Buzzer 54.

Figure 20:
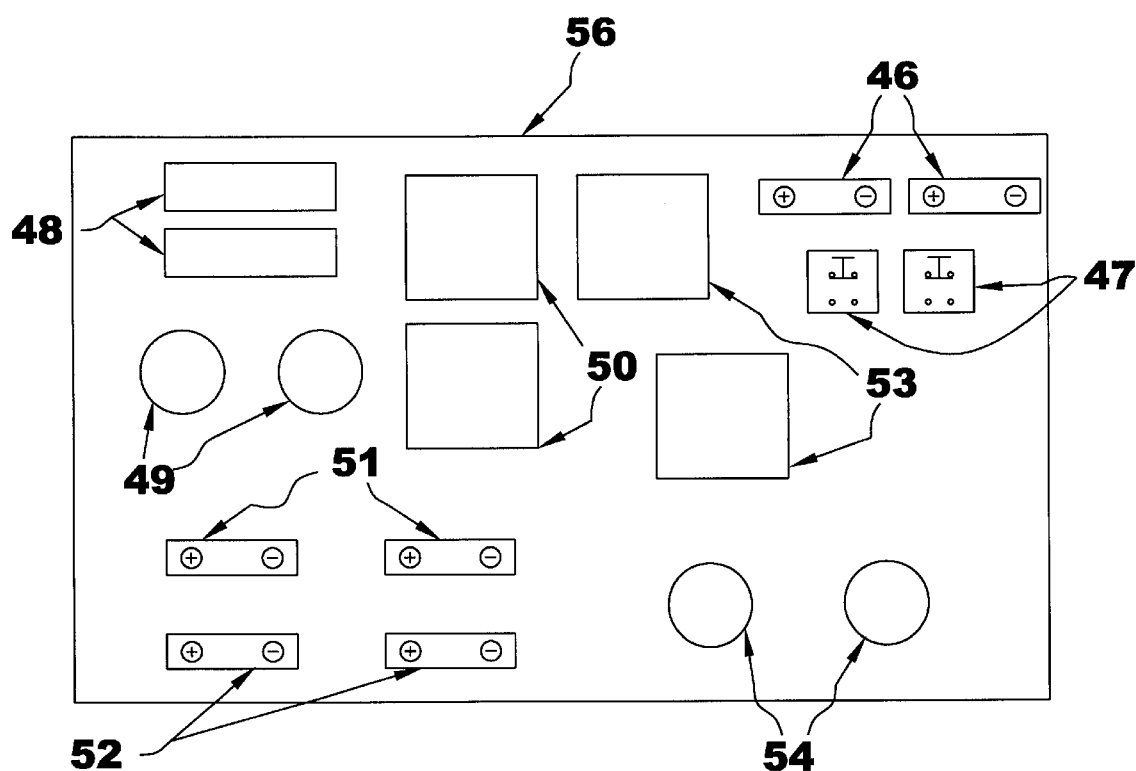
FIG. 20 is the circuit board for an ice cream maker with dual product containers described in FIG. 11.

FIG. 20 is the circuit board 56 of an ice cream maker with dual product containers described in FIG. 11 and comprises two Electrical Jacks 46, two On/Off Switches 47, two Circuit Breakers 48, two Temperature Switches 49, two Timers 50, two Fan Motor Contacts 51, two Gear Motor Contacts 52, two Pulsating 15 second Timers 53, and two Pezo Buzzers 54.

In operation, open component cover (20 or 42) place 18 or 24 volt battery or batteries into the Motorized lid (1 or 41), replace component cover (20 or 42) and plug in adapter and put charging cord into 120 volt outlet for approximately 45 minutes. Raise or remove motorized Lid (1 or 41), attach creamer (23 or 40), add ice-cream mixture and place the motorized lid (1 or 41) on the container housing (2 or 43). Push the On/Off Push Button 8 which closes the switch. Place in Freezer. 18 or 24 volt dc is placed onto the contact of the temperature switch 49. Once the unit has reached approximately 48 degrees the contacts close. The two 18 or 24 volt dc fans 3 are then energized and aid in providing cool airflow throughout the container housing (2 or 43). The timer 50 is now energized and allows the gears to start, thus causing the creamer (23 or 40) to rotate inside the tank. After approximately 20 minutes the ice-cream mixture becomes stiff, the timer 50 is near expiration and the gear motor 17 stops. Fifteen seconds before the timer stops, a 50 lb Pezo Buzzer 54 alarm is energized signaling that the ice-cream is ready.

In case the creamer is jammed, the circuit breaker/s 48 will trip or lose contact, causing the motor run circuit to de-energize. The normally open contacts will close and cause the pulsating timer 53 to send a signal to the Pezo Buzzer 54 alarm. This tone signifies that there is a malfunction and the alarm will sound for approximately 20 seconds then resets itself. Upon inspection and the jam is cleared, the ice-cream maker may be re-started by pressing the reset button 7.

What I claim as my invention is:

1. A transferable battery-operated ice cream maker to be used in the freezer compartment of any domestic or commercial refrigerator and/or ice chest comprising:

a removable product container into which ice cream ingredients are placed, stirred and frozen;

a container housing into which the product container is placed, the container housing including a fan motor assembly for supplying freezer air to the product container, the fan motor assembly having a fan motor and fan blades;

a motorized lid that covers the container housing and seals in the product container;

a creamer attached to the motorized lid to stir the ice cream ingredients;

a storage lid to place over the product container; and circuit boards that house all the electronic components;

said container housing is a vessel which comprises: a power strip to supply power to the fan motor; a fan housing that shelters and protects the fan motor assembly; fan grills to prevent damage to the fan blade; container housing handles for easy removal to and from the freezer compartment; an air diverter to evenly split the air across the product container; a vortex air channel that allows freezer air to pass across the product container; an exhaust port to discharge warm air after it has been heated by the product container; and product container handle that has a spring load to provide effortless removal of the product container.

2. A transferable battery-operated ice cream maker to be used in the freezer compartment of any domestic or commercial refrigerator and/or ice chest comprising:

a removable product container into which ice cream ingredients are placed, stirred and frozen;

a container housing into which the product container is placed;

a motorized lid that covers the container housing and seals in the product container;

a creamer attached to the motorized lid to stir the ice cream ingredients;

a storage lid to place over the product container; and circuit boards that house all the electronic components;

the container housing is a vessel which comprises: container housing handles for easy removal to and from the freezer compartment; an air diverter to evenly split the air across the product container; a vortex air channel that allows freezer air to pass across the product container; an exhaust port to discharge warm air after it has been heated by the product container; product container handle that has a spring load to provide effortless removal of the product container.

3. A transferable battery-operated ice cream maker to be used in the freezer compartment of any domestic or commercial refrigerator and/or ice chest comprising:

two removable product containers into which ice cream ingredients are placed, stirred and frozen;

a container housing into which the product containers are placed, the container housing including a fan motor assembly for supplying freezer air to the product containers, the fan motor assembly having a fan motor and fan blades;

a motorized lid that covers the container housing and seals in the product containers;

creamers attached to the motorized lid to stir the ice cream ingredients;

a storage lid to place over the product containers; and circuit boards that house all the electronic components;

said a container housing is a vessel which comprises: a power strip to supply power to the fan motor; a fan housing that shelters and protects the fan motor assembly; fan grills to prevent damage to the fan blade; container housing handles for easy removal to and from the freezer compartment; an air diverter to evenly split the air across the product containers; vortex air channels that allows freezer air to pass across the product containers; exhaust ports to discharge warm air after it has been heated by one or both product containers; and product container handles that have a spring load to provide effortless removal of product containers.

4. A transferable battery-operated ice cream maker to be used in the freezer compartment of any domestic or commercial refrigerator and/or ice chest comprising:

two removable product containers into which ice cream ingredients are placed, stirred and frozen;

a container housing into which the product containers are placed;

a motorized lid that covers the container housing and seals in the product containers;

creamers attached to the motorized lid to stir the ice cream ingredients;

a storage lid to place over the product containers; and circuit boards that house all the electronic components;

said motorized lid including an additive plug to prevent any outside freezer contaminants from entering the product container; an additive tube whereby extra ingredients can be added to the mixture in the product container; a push button latch assembly to secure the component cover to the motorized lid; an LED readout-annunciation panel to display the time remaining in a cycle; a reset push button to restart the ice cream maker should it stop the process; a container lid that is built into the motorized lid and covers the product container; a gear box and gear motor assembly to spin the creamer that whip the ice cream ingredients; an 18 or 24 volt battery as a portable electrical power source; a spring loaded hinge assembly to connect the lid and the container housing together; a component cover to protect the components inside of the lid; a seal to prevent odors from entering the product container; a latch slot with secures the component lid latch to the motorized lid, a charging connection plug for recharging the battery, a component lid tab to secure the component cover; and bottom edge to provide a tight seal for the container housing.

5. A transferable battery-operated ice cream maker to be used in the freezer compartment of any domestic or commercial refrigerator and/or ice chest comprising:

two removable product containers into which ice cream ingredients are placed, stirred and frozen;

a container housing into which the product containers are placed;

a motorized lid that covers the container housing and seals in the product containers;

creamers attached to the motorized lid to stir the ice cream ingredients;

a storage lid to place over the product containers; and circuit boards that house all the electronic components;

said motorized lid comprises: two additive plugs to prevent any outside freezer contaminants from entering the product containers; two additive tubes whereby extra ingredients can be added to the mixture in the product containers; two push button latch assemblies to secure the component cover to the motorized lid; two LED readout-annunciation panels to display the time remaining in a cycle; two reset push buttons to restart the ice cream maker should it stop the process; a container lid that is built into the motorized lid and covers the product container; two gear box and gear motor assemblies to spin the creamer that whip the ice cream ingredients; two 18 or 24 volt battery as two portable voltage sources; two spring loaded hinge assemblies to connect the lid and the container housing together; two component covers to protect the components inside of the lid; a seal to prevent odors from entering the product container; two latch slots which secures the component lid latch to the motorized lid; two charging connection plugs for recharging the batteries, two component lid tabs to secure the component cover; and a bottom edge to provide a tight seal for the container housing.

6. A transferable battery-operated ice cream maker to be used in the freezer compartment of any domestic or commercial refrigerator and/or ice chest comprising:

a removable product container into which ice cream ingredients are placed, stirred and frozen;

a container housing into which the product container is placed, the container housing including a fan motor assembly for supplying freezer air to the product container, the fan motor assembly having a fan motor and fan blades;

a motorized lid that covers the container housing and seals in the product container;

a creamer to stir the ice cream ingredients;

a storage lid to place over the product container; and circuit boards that house all the electronic components;

said creamer stirs the ice cream ingredients from beginning to completion and is attached to a creamer connection at the bottom of the motorized lid.

7. A transferable battery-operated ice cream maker to be used in the freezer compartment of any domestic or commercial refrigerator and/or ice chest comprising:
- a removable product container into which ice cream ingredients are placed, stirred and frozen;
- a container housing into which the product container is placed;
- a motorized lid that covers the container housing and seals in the product container;
- a creamer attached to the motorized lid to stir the ice cream ingredients;
- a storage lid to place over the product container; and
- circuit boards that house all the electronic components;
- said removable product container includes a temperature sensor to detect when the temperature reaches 48 degrees Fahrenheit.

8. A transferable battery-operated ice cream maker to be used in the freezer compartment of any domestic or commercial refrigerator and/or ice chest comprising:
- a removable product container into which ice cream ingredients are placed, stirred and frozen;
- a container housing into which the product container is placed;
- a motorized lid that covers the container housing and seals in the product container;
- a creamer attached to the motorized lid to stir the ice cream ingredients;
- a storage lid to place over the product container; and
- circuit boards that house all the electronic components;
- said circuit boards that house all the electronic components for the ice cream maker comprises: a jack for battery power plug-in; an on/off switch that allows 18 or 24 volts DC to the circuit board; a circuit breaker that halts the freezing cycle in case of malfunction; a timer that starts and stops the ice cream making cycle; a gear motor contact that supplies 18 or 24 volt DC power to the gear motor; and a piezo buzzer that sounds an alarm if there are in malfunctions during the freezing process.

\* \* \* \* \*